(12) United States Patent
Hakoda

(10) Patent No.: US 7,132,067 B2
(45) Date of Patent: *Nov. 7, 2006

(54) MOLD-CLAMPING CONTROL METHOD FOR INJECTION MOLDING MACHINE

(75) Inventor: Takashi Hakoda, Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 168 days.

This patent is subject to a terminal disclaimer.

(21) Appl. No.: 10/834,004

(22) Filed: Apr. 29, 2004

(65) Prior Publication Data

US 2004/0217501 A1   Nov. 4, 2004

(30) Foreign Application Priority Data

May 2, 2003 (JP) ............................. 2003-127395
May 2, 2003 (JP) ............................. 2003-127396
May 2, 2003 (JP) ............................. 2003-127397

(51) Int. Cl.
*B29C 45/64* (2006.01)
*B29C 45/80* (2006.01)

(52) U.S. Cl. ............... 264/40.1; 264/40.5; 264/328.1; 425/137; 425/150; 425/589

(58) Field of Classification Search ............ 264/40.1, 264/40.5, 328.1; 425/137, 138, 150, 589, 425/595, 593

See application file for complete search history.

(56) References Cited

U.S. PATENT DOCUMENTS

| 5,115,418 | A | * | 5/1992 | Shimada ..................... 318/616 |
| 5,304,906 | A | * | 4/1994 | Arita et al. ............. 318/568.16 |
| 5,631,851 | A | * | 5/1997 | Tanaka et al. ................ 702/33 |
| 6,409,495 | B1 | * | 6/2002 | Kamiguchi et al. ........ 264/40.1 |
| 2006/0093695 | A1 | * | 5/2006 | Ueda et al. ................. 425/150 |

FOREIGN PATENT DOCUMENTS

| JP | 04-368832 | * | 12/1992 |
| JP | 2001-51721 | * | 2/2001 |
| JP | 2002-172670 A | | 6/2002 |

* cited by examiner

*Primary Examiner*—Jill L. Heitbrink
(74) *Attorney, Agent, or Firm*—Birch, Stewart, Kolasch & Birch, LLP

(57) ABSTRACT

A mold-clamping control method for an injection molding machine includes the steps of detecting a value of a monitor item in a monitor region predetermined in relation to a mold closing operation in a mold clamping step; performing emergency processing when the detected value exceeds a threshold value; and performing an automatic setting operation. This automatic setting operation includes the steps of periodically detecting the value of the monitor item in the monitor region at predetermined sampling intervals to thereby obtain detection values in sampling order; repeating the step of periodical detection for each of a predetermined number of shots; obtaining threshold values and torque limit values for individual places of sampling order, on the basis of the detection values, by use of predetermined arithmetic expressions; and storing the obtained threshold values and torque limit values for control use.

21 Claims, 12 Drawing Sheets

FIG.10

| SHOT COUNT | SAMPLING ORDER | | | |
|---|---|---|---|---|
| | t0 | t1 | ... | tn |
| 1 | 11.0 | 12.0 | ... | 12.0 |
| 2 | 11.2 | 12.2 | ... | 12.1 |
| 3 | 11.1 | 11.8 | ... | 12.3 |
| 4 | 11.2 | 11.9 | ... | 11.8 |
| 5 | 11.2 | 11.9 | ... | 12.1 |
| 6 | 11.5 | 12.1 | ... | 12.2 |
| 7 | 11.6 | 11.2 | ... | 11.8 |
| 8 | 11.3 | 11.5 | ... | 11.9 |
| 9 | 11.2 | 10.8 | ... | 12.0 |
| 10 | 11.0 | 11.3 | ... | 12.1 |
| AVERAGE VALUE Xi | 11.2 | 11.7 | ... | 12.0 |
| MAXIMUM VALUE Xw | 11.6 | 12.5 | ... | 12.3 |
| STANDARD DEVIATION $\sigma$ | 0.19 | 0.43 | ... | 0.16 |

| SHOT COUNT | SAMPLING ORDER | | | |
|---|---|---|---|---|
| | t0 | t1 | ... | tn |
| 1 | 1.17 | 1.25 | ... | 1.25 |
| 2 | 1.13 | 1.18 | ... | 1.19 |
| 3 | 1.10 | 1.20 | ... | 1.15 |
| 4 | 1.15 | 1.19 | ... | 1.24 |
| 5 | 1.14 | 1.21 | ... | 1.19 |
| 6 | 1.11 | 1.18 | ... | 1.23 |
| 7 | 1.10 | 1.17 | ... | 1.22 |
| 8 | 1.12 | 1.09 | ... | 1.19 |
| 9 | 1.15 | 1.08 | ... | 1.18 |
| 10 | 1.17 | 1.11 | ... | 1.20 |
| AVERAGE VALUE Ai | 1.13 | 1.17 | ... | 1.20 |
| MAXIMUM VALUE Aw | 1.25 | 1.28 | ... | 1.25 |

MOLD-CLAMPING CONTROL METHOD FOR INJECTION MOLDING MACHINE

This Non-provisional application claims priority under 35 U.S.C. § 119(a) on Patent Application No(s). 2003-127395; 2003-127396; and 2003-127397 filed in Japan on May 2, 2003, the entire contents of which are hereby incorporated by reference.

BACKGROUND OF THE INVENTION

1. Field of the Invention

The present invention relates to a mold-clamping control method for an injection molding machine, which method is favorably used in detecting a foreign object that is caught between a movable mold and a stationary mold during the course of a mold clamping step.

2. Description of the Related Art

Conventionally, in the field of an injection molding machine designed such that reciprocating motion produced by a drive unit composed of a servomotor and a ball-screw mechanism is transmitted to a movable platen via a toggle link mechanism, there has been known a foreign-object detection method for detecting a foreign object (e.g., a molded product) that is caught between a movable mold and a stationary mold upon movement of the movable platen in a mold closing direction (see, for example, Japanese Patent Application Laid-Open (kokai) No. 2002-172670).

The patent publication discloses a foreign-object detection method for an injection molding machine, including the steps of detecting a physical value related to a mold closing action in a monitor region during the course of a mold clamping step; and performing emergency processing associated with detection of a foreign object when a deviation between the detected physical value and a predetermined theoretical value is in excess of a threshold value. In the foreign-object detection method, a trial mold clamping operation is performed to thereby detect a maximum value of the deviation; and the maximum value is added to a preset reference value to thereby determine a threshold value to be used for foreign object detection.

In the above-mentioned foreign-object detection method (mold-clamping control method), the maximum deviation between the detected physical value and the preset theoretical value is added to the reference value to thereby determine the threshold value. Thus, the method can promptly and readily determine a fixed threshold value with high accuracy and high reliability.

However, the magnitude of a physical value related to a mold closing operation in a monitor region usually varies depending on, for example, dimensional errors and wear of mechanisms, lubrication and adjustment for maintenance, and uneven rotation of a servomotor. In the case of an automatic 24-hour operation, the magnitude of a physical value varies depending on an hour of the day because of, for example, temperature variations between day and night. Thus, when the threshold value is fixed, erroneous detection may arise as a result of variations in a physical value caused by a disturbance. Such a conventional method may cause unnecessary suspension of operation, thus involving unnecessary inspection by an operator, delay in a production schedule, and a failure to provide high consistency and high reliability in terms of mold-clamping control.

Also, when a foreign object is caught between a movable mold and a stationary mold, a physical value related to a mold closing operation is not properly detected, and a serve control system performs a feedback control such that the torque of a servomotor increases sharply. In order to cope with such a sharp increase in servomotor torque, in a monitor region where detection of a foreign object is performed, a torque limit signal is supplied to a servo circuit such that torque output does not exceed a predetermined torque limit value, thereby avoiding application of an excessive force to the molds. When the torque limit value is set too low, the drive force of the servomotor is suppressed, thereby causing inconsistent operation, such as a drop in rotational speed, with a resultant occurrence of erroneous detection. Usually, a user (operator) determines the torque limit value as appropriate in view of, for example, a product to be molded and molding conditions.

However, the user encounters difficulty in setting the torque limit value, since various factors must be considered. Particularly, since the user has a high regard for molds, he/she tends to set the torque limit value low, potentially resulting in inconsistent operation and a tendency toward occurrence of erroneous detection.

SUMMARY OF THE INVENTION

An object of the present invention is to provide a mold-clamping control method for an injection molding machine capable of reliably preventing erroneous detection of a foreign object to thereby avoid unnecessary suspension of operation even when a disturbance causes variations in the value of a monitor item (such as torque).

Another object of the present invention is to provide a mold-clamping control method for an injection molding machine capable of setting a threshold value for a monitor item in a highly adaptive, flexible manner to thereby ensure high consistency and high reliability in terms of mold-clamping control.

Still another object of the present invention is to provide a mold-clamping control method for an injection molding machine capable of automatically setting an accurate torque limit value to thereby enhance consistent operation, prevent occurrence of erroneous detection, and ensure high consistency and high reliability in terms of mold-clamping control.

To achieve the above objects, the present invention provides a mold-clamping control method for an injection molding machine, comprising the steps of detecting a value of a monitor item in a monitor region predetermined in relation to a mold closing operation during the course of a mold clamping step; performing emergency processing when the detected value exceeds a threshold value; and performing an automatic setting operation. The automatic setting operation includes the steps of periodically detecting the value of the monitor item in the monitor region at predetermined sampling intervals to thereby obtain detection values in sampling order; repeating the step of periodical detection for each of a predetermined number of shots; obtaining a threshold value for each place of sampling order, on the basis of the detection values, by use of a predetermined arithmetic expression; and storing the obtained threshold values for use in control. The automatic setting operation may include the steps of obtaining at least an average value and an adjustment value corresponding to a standard deviation, the average value and the standard deviation being obtained from the detection values that pertain to the same place of sampling order with respect to all of the shots; obtaining a threshold value for each place of sampling order by use of a predetermined arithmetic expression that includes a term of the average value and a term of the adjustment value; and storing the obtained threshold values for use in control. Further, the automatic setting operation may include the steps of periodically detecting a torque in the monitor region at predetermined sampling intervals to thereby obtain torque detection values in sampling order; repeating the step of periodical detection for each of a predetermined number of shots; obtaining a torque limit value for each place of sampling order, on the basis of the obtained torque detection values, by use of a predetermined arithmetic expression; and storing the obtained torque limit values for use in control.

BRIEF DESCRIPTION OF THE DRAWINGS

FIG. 10 is a table of differential detection values obtained through performance of the mold-clamping control method;

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the structure of an injection molding machine 1 to which a mold-clamping control method of the present embodiment can be applied will be described with reference to FIGS. 7 and 8.

Figure 7:
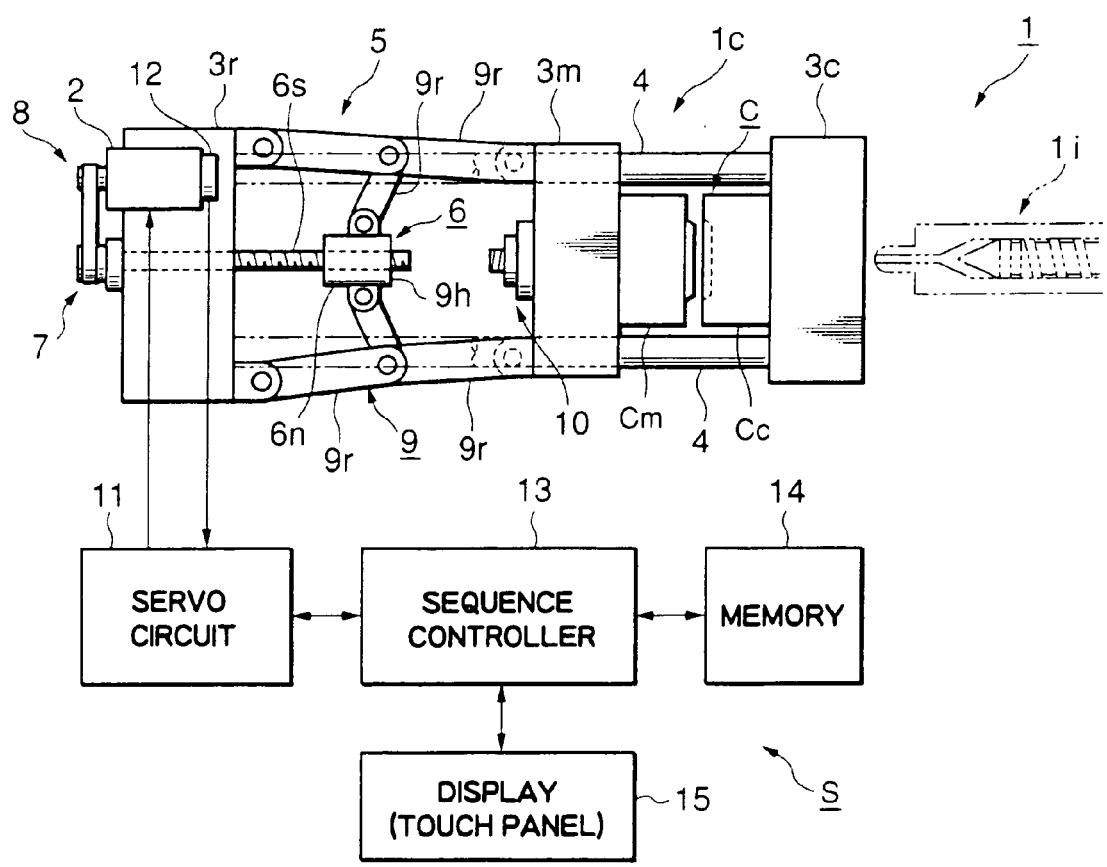
FIG. 7 is a view showing the structure of an injection molding machine to which the mold-clamping control method can be applied.

The injection molding machine 1 shown in FIG. 7 includes a mold clamping apparatus 1c, and an injection apparatus 1i indicated by an imaginary line. The mold clamping apparatus 1c includes a stationary platen 3c and a drive base 3r which are separated from each other. The stationary platen 3c and the drive base 3r are fixedly mounted on an unillustrated machine base. Four tie bars 4 extend between the stationary platen 3c and the drive base 3r. A movable platen 3m is mounted slidably on the tie bars 4. A movable mold Cm is attached to the movable platen 3m, and a stationary mold Cc is attached to the stationary platen 3c. The movable mold Cm and the stationary mold Cc constitute a mold C.

A drive mechanism 5 is disposed between the drive base 3r and the movable platen 3m. The drive mechanism 5 includes a drive unit 8, and a toggle link mechanism 9 attached between the drive base 3r and the movable platen 3m. The drive unit 8 includes a servomotor 2 attached to the drive base 3r; a ball screw mechanism 6 composed of a ball screw 6s rotatably supported on the drive base 3r and a nut 6n in screw-engagement with the ball screw 6s; and a rotation transmission mechanism 7 for transmitting rotation of the servomotor 2 to the ball screw 6s. The toggle link mechanism 9 is composed of a plurality of toggle link members 9r; and the nut 6n is fixed to a cross head 9h serving as an input portion. By virtue of the above-described configuration, reciprocating motion of the nut 6n is transmitted to the movable platen 3m via the toggle link mechanism 9. Reference numeral 10 denotes an ejector mechanism.

Meanwhile, reference letter S denotes a control system. The control system S includes a servo circuit 11, to which are connected the servomotor 2 and a rotary encoder 12 attached to the servomotor 2. A sequence controller 13 is connected to the servo circuit 11; and memory 14 and a display 15 having a touch panel are connected to the sequence controller 13.

Figure 8:
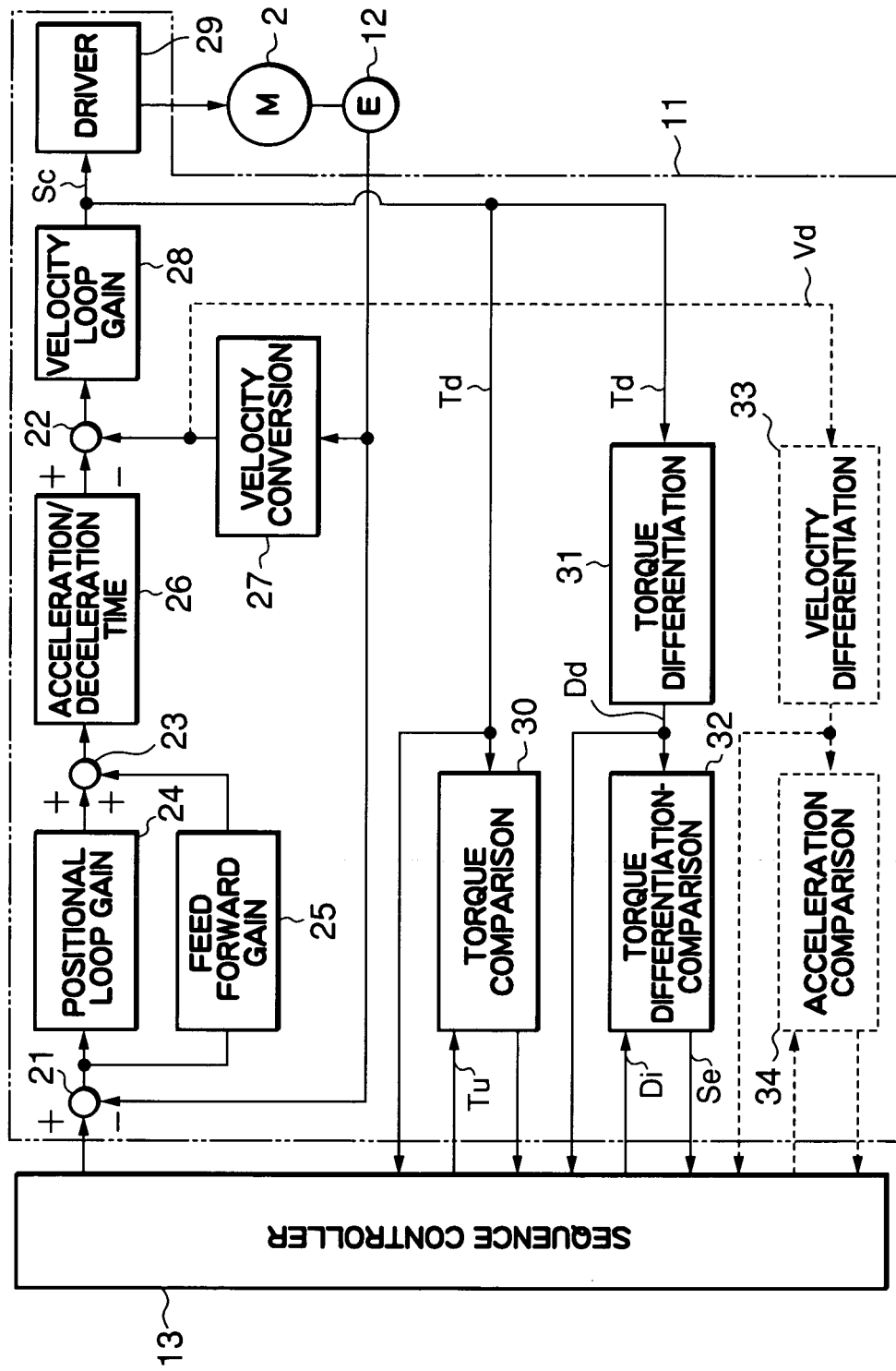
FIG. 8 is a block diagram of a servo circuit of the injection molding machine.

FIG. 8 shows a specific configuration of the servo circuit 11. The servo circuit 11 includes deviation calculation units 21 and 22; an adder 23; a positional-loop-gain-setting unit 24; a feed-forward-gain setting unit 25; an acceleration/deceleration-time setting unit 26; a velocity converter 27; a velocity-loop-gain setting unit 28; a driver 29; a torque comparison section 30; a torque differentiator 31; a torque differentiation-comparison section 32; a velocity differentiator 33; and an acceleration comparison section 34, to thereby constitute the servo control system as shown in FIG. 8. The functions (operations) of the respective portions will be described in relation to overall operation of the mold clamping apparatus 1c, which will be described later.

Next, overall operation of the mold clamping apparatus 1c which employs the mold-clamping control method according to the present embodiment will be described with reference to FIGS. 1 to 14.

Figure 1:
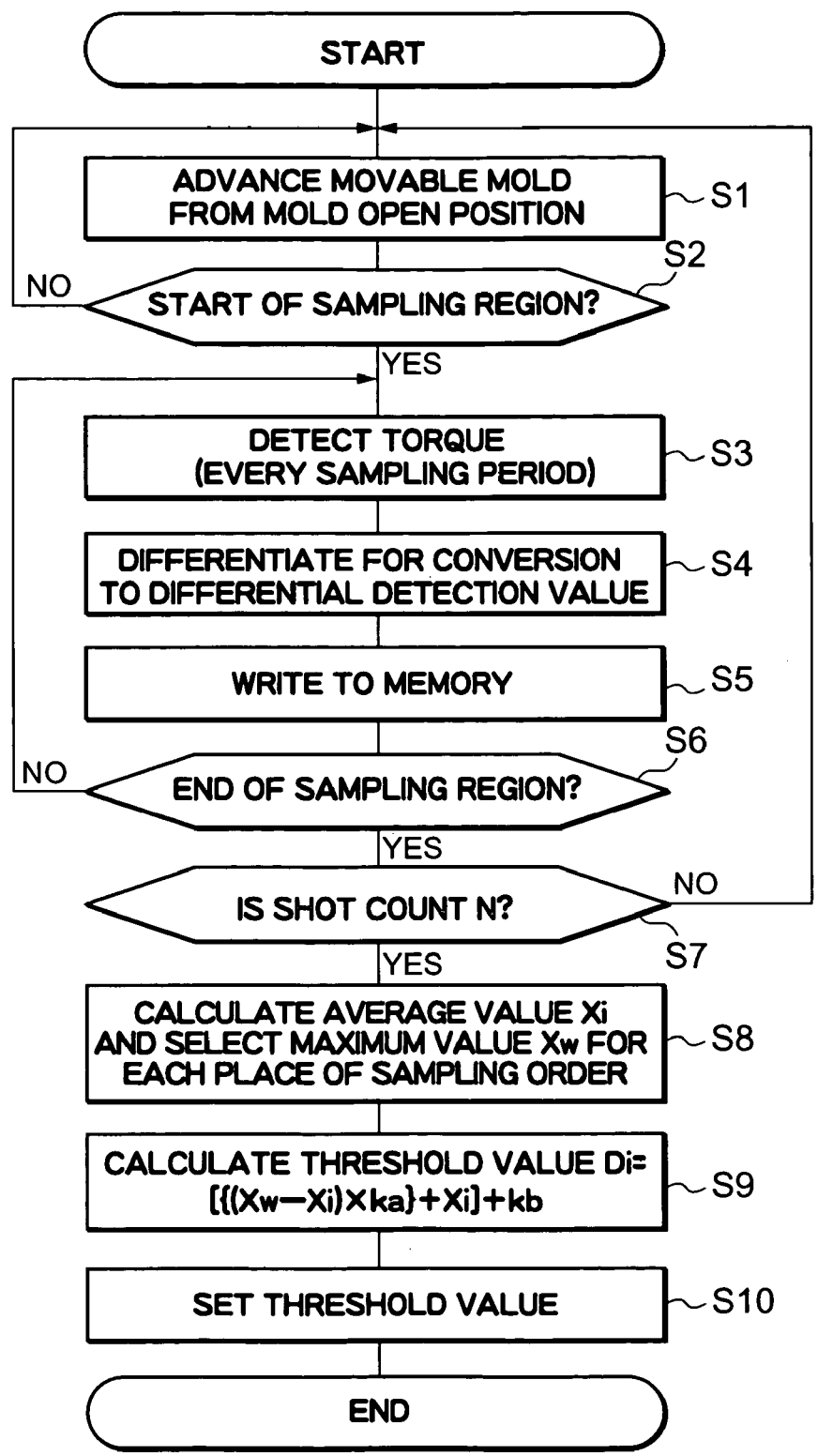
FIG. 1 is a flowchart showing a method of setting a threshold value used in a mold-clamping control method according to an embodiment of the present invention.
Figure 2:
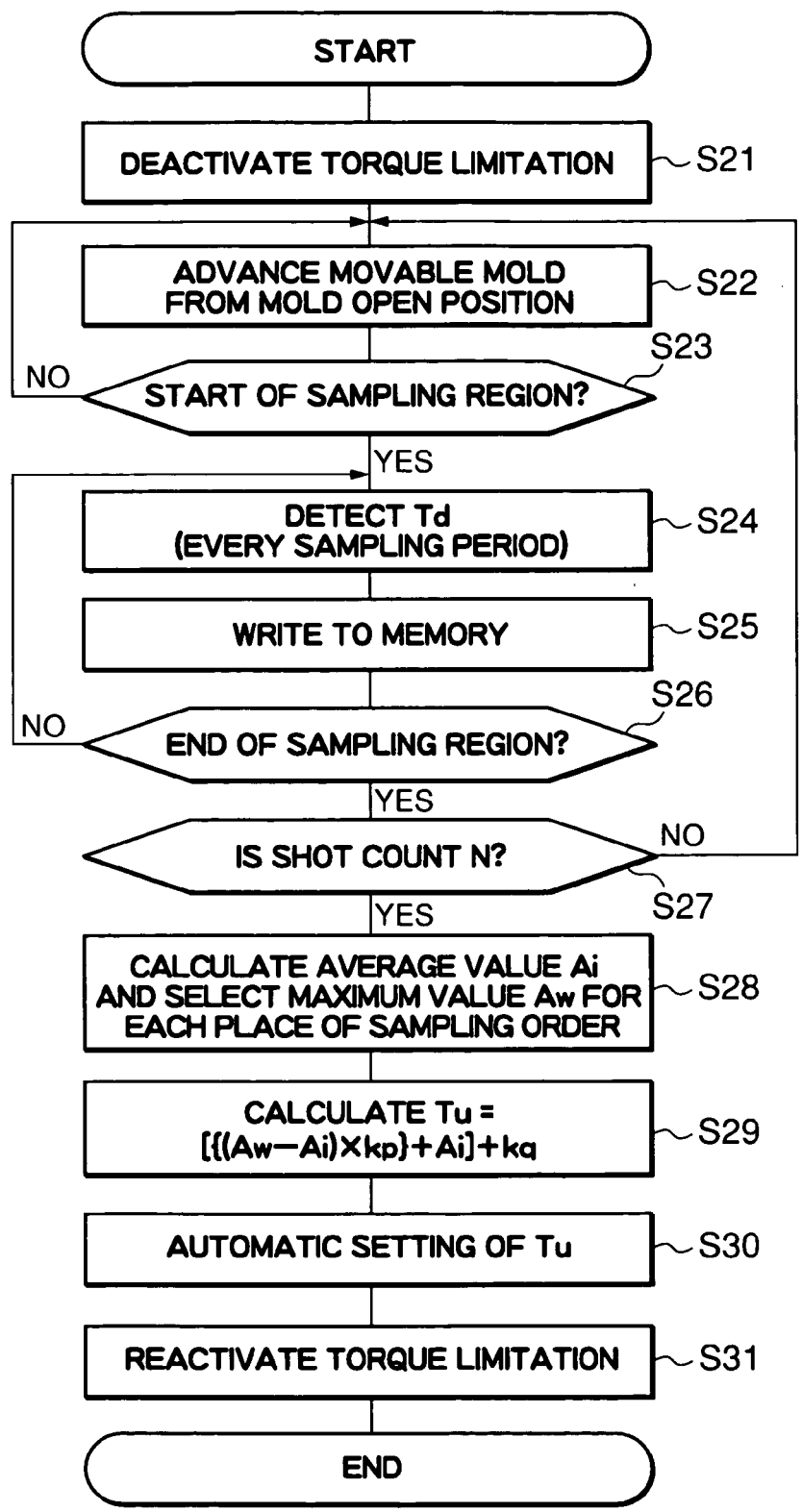
FIG. 2 is a flowchart showing a method of setting a torque limit value used in the mold-clamping control method.

First, a method of setting a threshold value Di and a torque limit value Tu used in the mold-clamping control method according to the present embodiment will be described with reference to the flowcharts shown in FIGS. 1 and 2. FIG. 1 shows a method of setting the threshold value Di, and FIG. 2 shows a method of setting the torque limitation value Tu.

When the mold-clamping control method according to the present embodiment is to be performed, the automatic setting mode is selected by means of a relevant function key displayed on the display 15. Selection of the automatic setting mode deactivates torque limitation (step S21).

The threshold value Di and the torque limit value Tu are initialized. This initialization can usually be performed through trial molding. Here, we assume that the movable platen 3m is located at the mold open position before start of the operation of the injection molding machine 1. Start of trial molding activates the servomotor 2, and the movable platen 3m is advanced from the mold open position (steps S1 and S22). In this case, initially, the movable platen 3m is advanced at high speed in the mold closing direction, whereby high-speed mold closing is effected. At this time, the servo circuit 11 performs velocity control and position control on the movable platen 3m. Specifically, the sequence controller 13 supplies a position command value to the deviation calculation unit 21 of the servo circuit 11. The deviation calculation unit 21 compares the position command value with a position detection value obtained from detection pulses output from the rotary encoder 12. Thus, there is obtained a positional deviation, on the basis of which position feedback control is performed. Notably, the positional deviation is compensated by the positional-loop-gain setting unit 24, the feed-forward-gain setting unit 25, and the acceleration/deceleration-time setting unit 26. An output of the acceleration/deceleration-time setting unit 26 is supplied to the deviation calculation unit 22 and compared with an output of the velocity converter 27. Thus, there is obtained a velocity deviation, on the basis of which velocity feedback control is performed. Notably, the velocity deviation is compensated by the velocity-loop-gain setting unit 28.

When the movable platen 3m is advanced in the mold closing direction and reaches a start point of a predetermined sampling region (monitor region), detection of a monitor item starts; specifically, torque (load torque (torque detection value Td)), which is a monitor item, is periodically detected at predetermined sampling intervals Δts (steps S2, S3, S23, and S24). In this case, the sampling region can be set between a start point of low-pressure mold clamping (low-velocity mold closing) and a start point of high-pressure mold clamping. These start points may be set in terms of either position or time. Notably, the sampling intervals Δts can be set to, for example, 2.5 ms. When the duration of the sampling region is assumed to be 8 seconds, the total sampling count is 3,200.

Load torque is detected by extracting a velocity control signal from the velocity-loop-gain setting unit 28. In other words, since the magnitude of the velocity control signal S corresponds to the magnitude of load torque, the voltage of the velocity control signal Sc is used as the torque detection value Td. The torque detection value Td that is periodically detected at the sampling intervals Δts is differentiated by the torque differentiator 31 to thereby be converted to a differential detection value Dd. The differential detection value Dd and the torque detection value Td are written to a data area of the memory 14 via the sequence controller 13 (steps S4, S5, and S25). A detecting operation for obtaining the differential detection value Dd is periodically performed at the sampling intervals Δts until the sampling region ends (steps S6, S3, etc. and steps S26, S24, etc.).

Figures 11, 12:
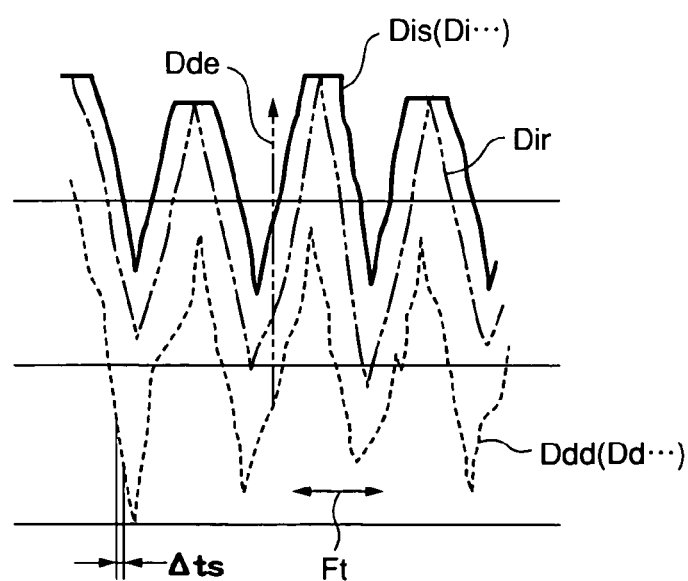
FIG. 11 is a table of torque detection values obtained through performance of the mold-clamping control method.
FIG. 12 is a diagram for explaining a method of selecting a maximum value for use as a threshold value during performance of the mold-clamping control method.
Figure 13:
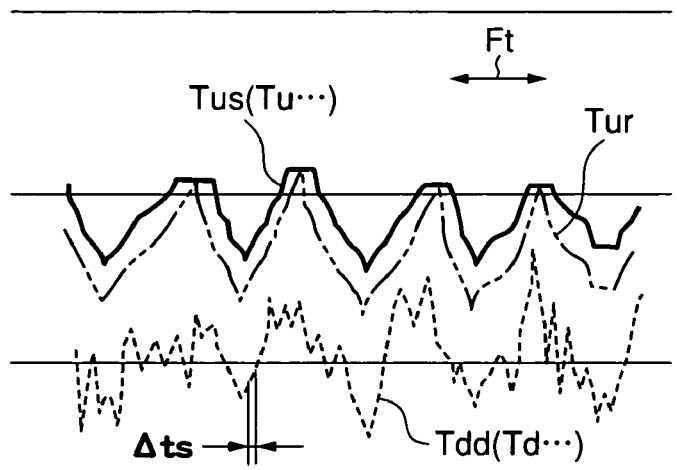
FIG. 13 is a diagram for explaining a method of selecting a maximum torque for use as a torque limit value during performance of the mold-clamping control method.

When the first shot (molding cycle) is completed, the next shot is performed. Similarly, the differential detection value Dd and the torque detection value Td are obtained through detection. Detection for obtaining the differential detection value Dd and the torque detection value Td is performed for each of a predetermined number (N) of shots (steps S7, S3, etc.; and S27, S24, etc.). FIG. 10 is a table of the differential detection values Dd contained in the data area of the memory 14. FIG. 11 is a table of the torque detection values Td contained in the data area of the memory 14. In the present embodiment, the shot count N is set to "10," and sampling is performed in the sampling order of t0, t1, . . . , tn for a single shot.

When detection is completed for all of N shots, threshold values Di are set on the basis of the obtained differential detection values Dd. First, an average value Xi is calculated from the differential detection values Dd that pertain to the same place of sampling order with respect to all of the shots (step S8). In FIG. 10, the average value Xi for the differential detection values Dd that pertain to, for example, the place t1 of sampling order (with respect to 10 shots) is "11.7."

A maximum value Xw is selected from the differential detection values Dd that pertain to the same place of sampling order with respect to all of the shots (step S8). In FIG. 10, the maximum value Xw for, for example, the place t1 of sampling order is "12.5.." In this case, the maximum value Xw is a greatest value selected from the differential detection values Dd that pertain to a plurality of places of sampling order consisting of the place concerned and a predetermined number of preceding and subsequent places of sampling order. The reason for this will be described with reference to FIG. 12. In the case where the maximum value is selected from values that pertain to the same place of sampling order, threshold value data vary as represented by Dir in FIG. 12, which graphs the threshold values Di in a time series manner. The threshold value data Dir vary with a tendency similar to that of detection value data Ddd shown in FIG. 12 except that the threshold value data Dir is offset upward from the detection value data Ddd. The detection value data Ddd is represented by graphing the differential detection values Dd in a time series manner. However, the detection data Ddd do not necessarily appear synchronously with the threshold value data Dir, but are dispersed in a time axis direction Ft; e.g., the detection data Ddd involve time lag. As a result, in some cases, the detection value data Ddd may exceed the threshold value data Dir at a certain point in the time axis direction Ft, resulting in occurrence of erroneous detection.

The above problem is avoided as follows. The maximum value Xw is a greatest value selected from the values that pertain to a plurality of places of sampling order consisting of the place concerned and a predetermined number of preceding and subsequent places of sampling order, thereby expanding a peak value of the threshold value data Dir along a predetermined time span in the time axis direction Ft as represented by threshold value data Dis in FIG. 12. In this case, the range of expansion (a predetermined range) can be arbitrarily set by selecting a numerical value, such as 1, 2, 3, 4 . . . . For example, when "1" is selected, one preceding place of sampling order and one subsequent place of sampling order are added to the place concerned. Thus, when "1" is selected, the predetermined range means three consecutive places of sampling order. Specifically, when the maximum value Xw is to be selected for the place t1 of sampling order, a maximum value is selected, for use as the maximum value Xw, from the values that pertain to the t0, t1, and t2 places of sampling order. Similarly, when "2" is selected, two preceding places of sampling order and two subsequent places of sampling order are added to the place concerned. Thus, the predetermined range means five consecutive places of sampling order. Notably, FIG. 10 shows an example case where the maximum value Xw for the place t1 of sampling order is a maximum value (not shown) appearing in the place t2 of sampling order.

The thus-obtained average value Xi and maximum value Xw are used to obtain the threshold value Di for each place of sampling order by use of the following arithmetic expression (step S9):

$$Di = Pi + kb$$
$$= [\{(Xw - Xi) \times ka\} + Xi] + kb$$

(where ka and kb are constants)

In this case, Pi is a reference value; and the constant kb is used to set a predetermined allowance (offset) for the reference value Pi. The constant ka can usually be set to an arbitrary value ranging from "1 to 2."

In place of the average value Xi, a median Xj can be used. Specifically, a minimum value Xs and a maximum value Xw are obtained from the differential detection values Dd that pertain to the same place of sampling order with respect to all of the shots; the median Xj is obtained, on the basis of the minimum value Xs and the maximum value Xw, by use of the arithmetic expression Xj=(Xw−Xs)/2; and the threshold value Di for each place of sampling order is obtained, on the basis of the median Xj and the maximum value Xw, by use of the following arithmetic expression:

$$Di=[\{(Xw-Xj) \times ka\}+Xj]+kb$$

(where ka and kb are constants)

In the above arithmetic expression, the constants ka and kb may be identical to the aforementioned constants ka and kb or may differ from them as needed.

Alternatively, σ standard deviation a is obtained by statistical means from the differential detection values Dd that pertain to the same place of sampling order with respect to all of the shots; and the threshold value Di is obtained on the basis of the standard deviation σ. The standard deviation σ can be obtained by use of the following arithmetic expression:

$$\sigma = \sqrt{\{\Sigma(Dd - Xi)^2 / N\}}$$
$$= \sqrt{[\{(Dd0 - Xi)^2 + (Dd1 - Xi)^2 + (D2 - Xi)^2 + \ldots + (Ddn - Xi)^2\}/N]}$$

In this case, Dd0, Dd1, Dd2 . . . Ddn are differential detection values that respectively pertain to the places t0, t1, t2 . . . tn of sampling order. The above arithmetic expression for obtaining the standard deviation σ is a generally known statistical means. However, an arithmetic expression for obtaining the standard deviation σ (the degree of dispersion) is not limited to the above arithmetic expression, so long as the degree of dispersion can be numerically expressed.

On the basis of the obtained average value Xi, maximum value Xw, and standard deviation σ, the threshold value Di for each place of sampling order is obtained by use of the following arithmetic expression:

$$Di = Pi + ks$$
$$= [\{(Xw - Xi) \times (\sigma \times kr)\} + Xi] + ks$$

(where kr and ks are constants)

In this case, Pi is a reference value; and the constant ks is used to set a predetermined allowance (offset) for the reference value Pi. The constant kr can usually be set to an arbitrary value equal to or greater than "1."

Figure 14:
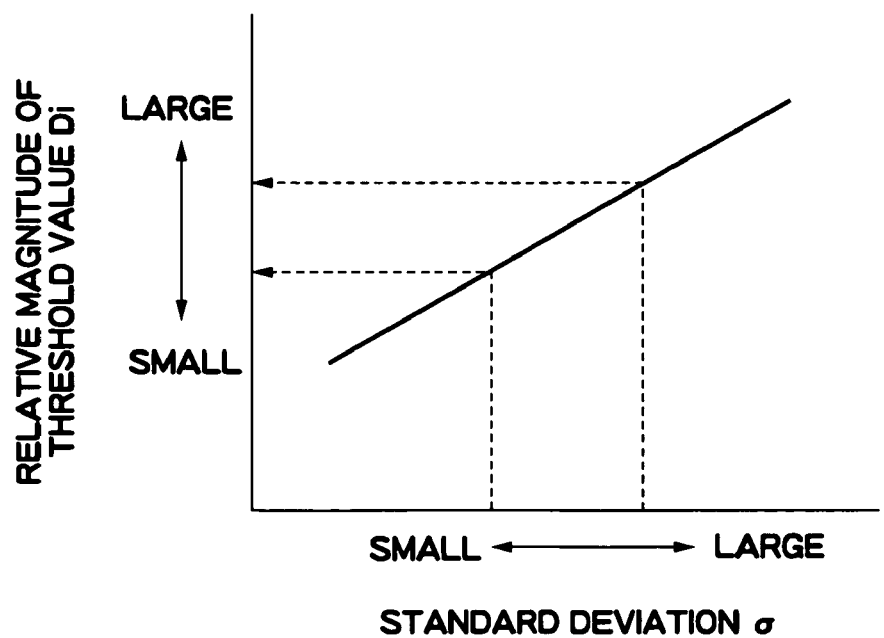
FIG. 14 is a characteristic diagram showing the magnitude of a threshold value in relation to a standard deviation during performance of the mold-clamping control method.

In the above arithmetic expression, the term (σ×kr) is an adjustment value corresponding to the standard deviation σ. Therefore, as shown in FIG. 14, when the standard deviation σ is large; i.e., in a region where the differential detection values Dd disperse to a large extent, the threshold value Di is set large in relation to the differential detection value Dd. Thus, sensitivity in terms of detection of a foreign object becomes low (monitoring becomes loose), thereby more reliably avoiding erroneous detection. By contrast, when the standard deviation σ is small; i.e., in a region where the differential detection values Dd disperse to a small extent, the threshold value Di is set small in relation to the differential detection value Dd. Thus, sensitivity in terms of detection of a foreign object becomes high (monitoring becomes tight), thereby enabling more reliable detection of a foreign object. By use of an adjustment value (σ×kr) corresponding to the degree of dispersion of the differential detection values Dd at the time of detection, the threshold value Di can be set in a highly adaptive, flexible manner in relation to the differential detection value Dd, thereby ensuring high consistency and high reliability in terms of mold-clamping control.

As mentioned previously, also in this case, in place of the average value Xi, the median Xj can be used. Specifically, a minimum value Xs and a maximum value Xw are obtained from the differential detection values Dd that pertain to the same place of sampling order with respect to all of the shots; the median Xj is obtained, on the basis of the minimum value Xs and the maximum value Xw, by use of the arithmetic expression Xj=(Xw−Xs)/2; and the threshold value Di for each place of sampling order is obtained, on the basis of the median Xj and the maximum value Xw, by use of the following arithmetic expression:

$$Di=[\{(Xw-Xj) \times (\sigma \times kr)\}+Xj]+ks$$

(where kr and ks are constants)

In the above arithmetic expression, the constants kr and ks may be identical to the aforementioned constants kr and ks or may differ from them as needed.

The threshold values Di for the individual places of sampling order can also be obtained by use of the following arithmetic expression that does not involve a term of the maximum value Xw.

$$Di = Pi + kj$$
$$= \{Xi + (\sigma \times ki)\} + kj$$

(where ki and kj are constants)

In this case, Pi is a reference value; and the constant kj is used to set a predetermined allowance (offset) for the reference value Pi. The constant ki is usually set to an arbitrary value equal to or greater than "1." The term (σ×ki) is an adjustment value corresponding to the standard deviation σ.

When the median Xj is to be used, the threshold value Di can be obtained by the following arithmetic expression:

$$Di=[\{Xj+(\sigma \times ki)\}]+kj$$

In the above arithmetic expression, the constants ki and kj may be identical to the aforementioned constants ki and kj or may differ from them as needed.

Meanwhile, torque limit values Tu are set on the basis of the obtained torque detection values Td. First, an average value Ai is calculated from the torque detection values Td that pertain to the same place of sampling order with respect to all of the shots (step S28). In FIG. 11, the average value Ai for the torque detection values Td that pertain to, for example, the place t1 of sampling order (with respect to 10 shots) is "1.17." A maximum value Aw is selected from the torque detection values Td that pertain to the same place of sampling order with respect to all of the shots (step S28). In FIG. 11, the maximum value Aw for, for example, the place t1 of sampling order is "1.28."

In this case, the maximum value Aw is a greatest value selected from the torque detection values Td that pertain to a plurality of places of sampling order consisting of the place concerned and a predetermined number of preceding and subsequent places of sampling order. The reason for this will be described with reference to FIG. 13. In the case where the maximum value is selected from values that pertain to the same place of sampling order, torque limit value data vary as represented by Tur in FIG. 13, which graphs the torque limit values Tu in a time series manner. The torque limit value data Tur vary with a tendency similar to that of torque detection value data Tdd shown in FIG. 13 except that the torque limit value data Tur are offset upward from the torque detection value data Tdd. The torque detection value data Tdd are represented by graphing the torque detection values Td in a time series manner. However, the torque detection value data Tdd do not necessarily appear synchronously with the torque limit value data Tur, but are dispersed in a time axis direction Ft; e.g., the torque detection value data Tdd involve time lag. As a result, in some cases, the torque detection value data Tdd may reach the torque limit value data Tur at a certain point in the time axis direction Ft, resulting in erroneous control in which a torque limiting operation is performed in response to detection of torque whose magnitude is not so large as to require performance of a torque limiting operation.

The above problem is avoided as follows. The maximum value Aw is a greatest value selected from the values that pertain to a plurality of places of sampling order consisting of the place concerned and a predetermined number of preceding and subsequent places of sampling order, thereby expanding a peak value of the torque limit value data Tur along a predetermined time span in the time axis direction Ft as represented by torque limit value data Tus in FIG. 13. In this case, the range of expansion (a predetermined range) can be arbitrarily set by selecting a numerical value, such as 1, 2, 3, 4 . . . . For example, when "1" is selected, one preceding place of sampling order and one subsequent place of sampling order are added to the place concerned. Thus, when "1" is selected, the predetermined range means three consecutive places of sampling order. Specifically, when the maximum value Aw is to be selected for the place t1 of sampling order, a maximum value is selected, for use as the maximum value Aw, from the values that pertain to the t0, t1, and t2 places of sampling order. Similarly, when "2" is selected, two preceding places of sampling order and two subsequent places of sampling order are added to the place concerned. Thus, the predetermined range means five consecutive places of sampling order. Notably, FIG. 11 shows an example case where the maximum value Aw for the place t1 of sampling order is a maximum value (not shown) appearing in the place t2 of sampling order.

The thus-obtained average value Ai and maximum value Aw are used to obtain the torque limit value Tu for each place of sampling order by use of the following arithmetic expression (step S29):

$$Tu = Qi + kq$$
$$= [\{(Aw - Ai) \times kp\} + Ai] + kq$$

(where kp and kq are constants)

In this case, Qi is a reference value; and the constant kq is used to set a predetermined allowance (offset) for the reference value Qi. The constant kp can usually be set to an arbitrary value ranging from "1 to 2."

In place of the average value Ai, a median Aj can be used. Specifically, a minimum value As and a maximum value Aw are obtained from the torque detection values Td that pertain to the same place of sampling order with respect to all of the shots; the median Aj is obtained, on the basis of the minimum value As and the maximum value Aw, by use of the arithmetic expression Aj=(Aw−As)/2; and the torque limit value Tu for each place of sampling order is obtained, on the basis of the median Aj and the maximum value Aw, by use of the following arithmetic expression:

$$Tu=[\{(Aw-Aj) \times kp\}+Aj]+kq$$

(where kp and kq are constants)

In the above arithmetic expression, the constants kp and kq may be identical to the aforementioned constants kp and kq or may differ from them as needed.

Figure 9:
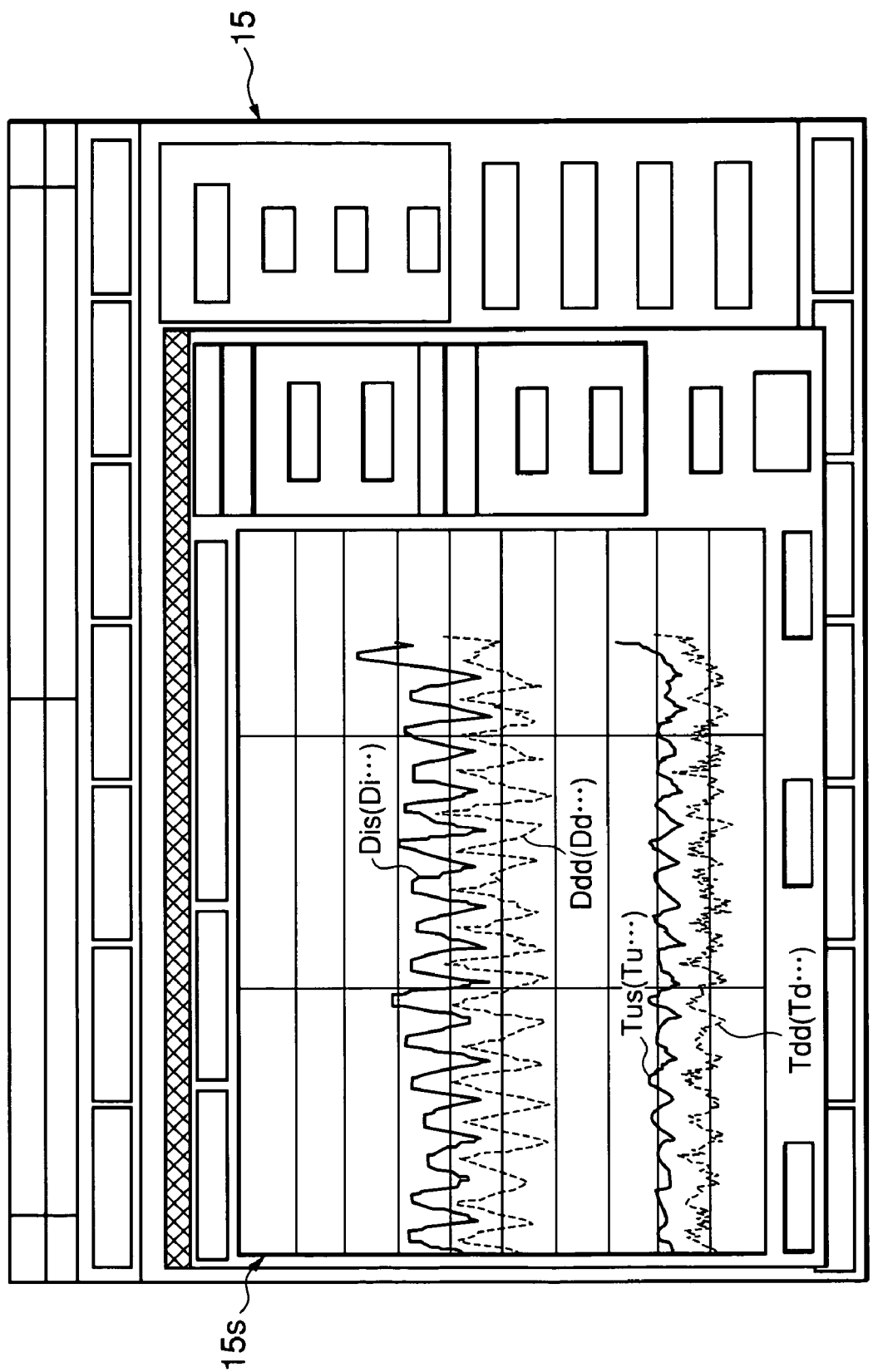
FIG. 9 is a diagram showing a display screen used during performance of the mold-clamping control method.

The thus-obtained threshold values Di and torque limit values Tu are set (automatically set) in the memory 14 and displayed on a data display section 15s of the display 15 shown in FIG. 9 (steps S10 and S30). In FIG. 9, Dis indicates threshold value data represented by graphing the set threshold values Di, and Tus indicates torque limit value data represented by graphing the set torque limit values Tu. The above-described series of operations for obtaining the threshold values Di (threshold value data Dis) and the torque limit values Tu (torque limit value data Tus) is performed fully automatically by means of sequence operations. When setting (automatic setting) of the torque limit values Tu is completed, torque limitation, which has been deactivated as a result of selection of the automatic setting mode, is reactivated (step S31).

Figure 3:
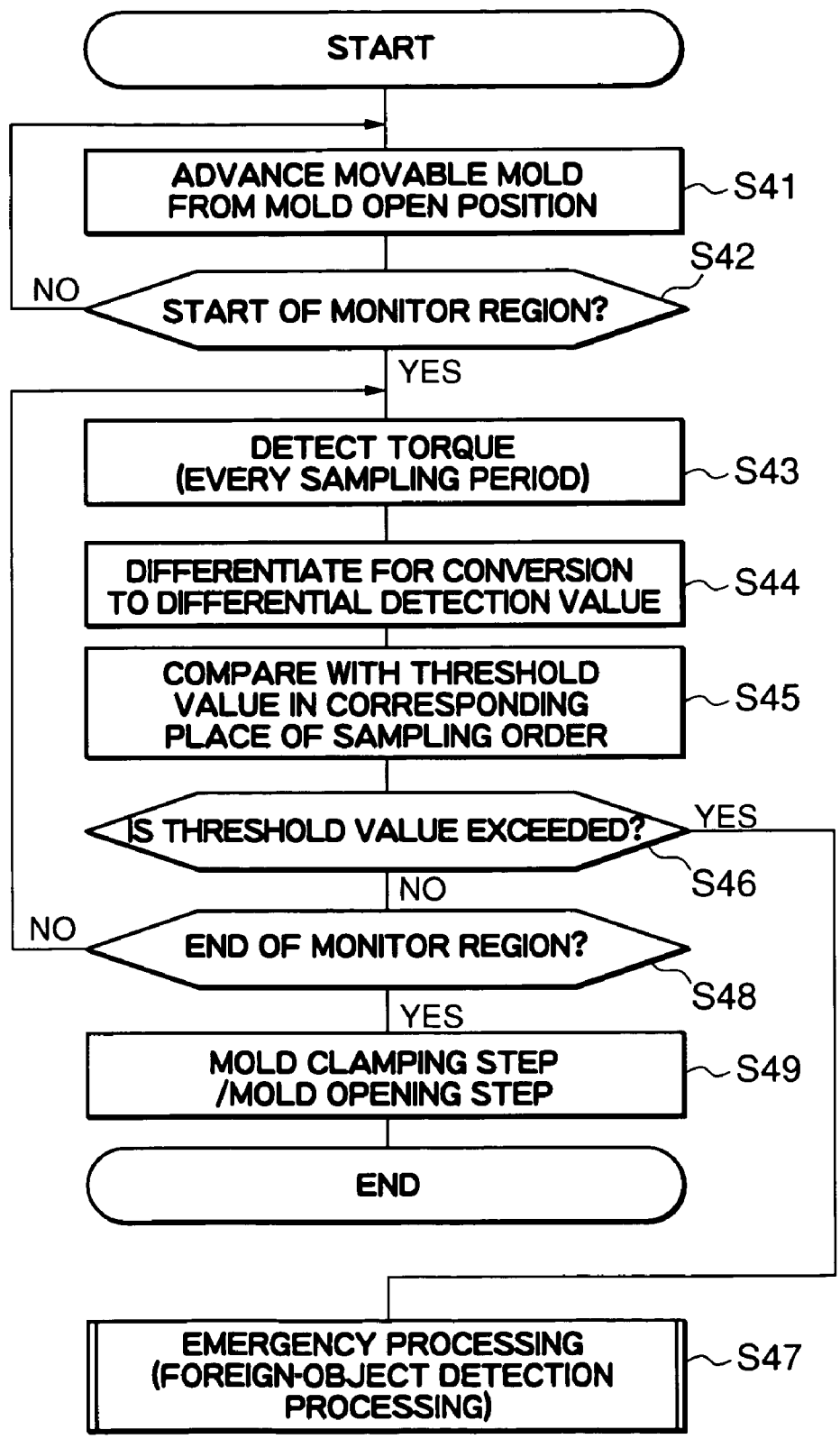
FIG. 3 is a flowchart showing particularly a foreign-object detecting operation of the mold-clamping control method in relation to overall operation during a production run.
Figure 4:
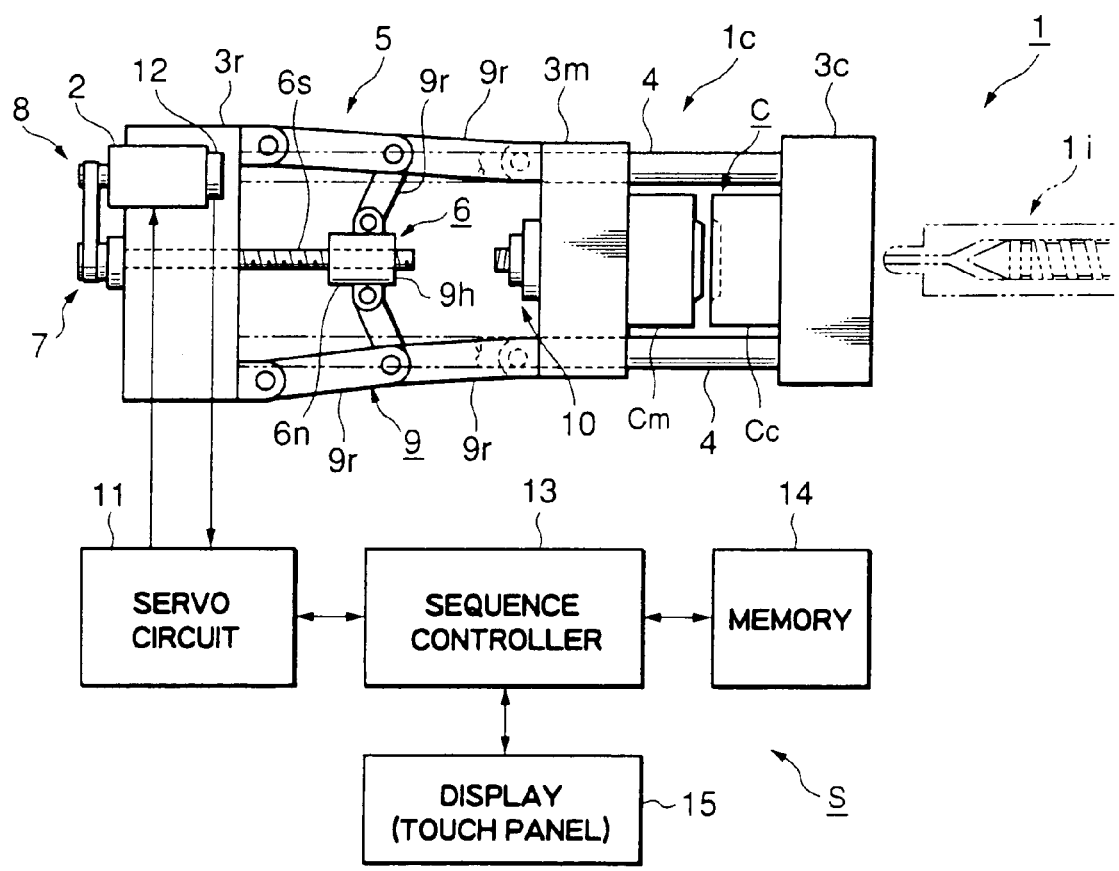
FIG. 4 is a flowchart showing particularly a torque limiting operation of the mold-clamping control method in relation to overall operation during a production run.

Next, overall operation of the injection molding machine during a production run will be described with reference to the flowcharts shown in FIGS. 3 and 4. FIG. 3 particularly shows a foreign-object detecting operation in relation to the overall operation, and FIG. 4 particularly shows a torque limiting operation in relation to the overall operation.

Here, we assume that the movable platen 3m of the mold clamping apparatus 1c is located at the mold open position before start of the operation of the injection molding machine 1. In a mold clamping step, the servomotor 2 is activated, and the movable platen 3m is advanced from the mold open position (steps S41 and S51). Initially, the movable platen 3m is advanced at high speed in the mold closing direction, whereby high-speed mold closing is effected. As in the aforementioned case where the threshold value Di is initialized, the servo circuit 11 performs velocity control and position control on the movable platen 3m. When the movable platen 3m reaches a predetermined monitor region during movement in the mold closing direction, torque (load torque (torque detection value Td)) is periodically detected at the aforementioned sampling intervals Δts (steps S42, S43, S52, and S53). The monitor region is identical to the aforementioned sampling region. As in the case where the threshold value Di is initialized, torque is detected through extraction of the velocity control signal Sc from the velocity-loop-gain setting unit 28. The torque detection value Td that is thus-obtained periodically at the sampling intervals Δts is supplied to the torque differentiator 31 and differentiated by the differentiator 31 to thereby be converted to the differential detection value Dd (step S44). The differential detection value Dd is supplied to the torque differentiation-comparison section 32. Meanwhile, the threshold value Di identical in a place of sampling order with the differential detection value Dd is supplied to the torque differentiation-comparison section 32 from the sequence controller 13. Thus, the torque differentiation-comparison section 32 compares the threshold value Di and the differential detection value Dd that pertain to the same place of sampling order (step S45).

Here, we assume that a foreign object is caught between the movable mold Cm and the stationary mold Cc. In this case, since load torque increases sharply at the time of catching a foreign object, the magnitude of the velocity control signal Ss also increases sharply. Thus, the differential detection value Dd obtained from the torque differentiator 31 increases abruptly and exceeds the threshold value data Dis as represented by Dde in FIG. 12. The torque differentiation-comparison section 32 judges from the abrupt increase that a foreign object has been caught, and the servo circuit 11 supplies a foreign-object detection signal Se to the sequence controller 13. In response thereto, the sequence controller 13 performs predetermined emergency processing such as a retreat operation of the servomotor 2 and generation of an alarm (steps S46 and S47).

Meanwhile, when a normal operation continues without presence of a foreign object, the operation of detecting the differential detection value Dd is repeated at the preset sampling intervals Δts, since the detection value data Ddd do not exceed the threshold value data Dis (steps S48, S43, etc.).

Meanwhile, the torque detection value Td is obtained through periodic detection at the sampling intervals Δts, and the thus-obtained torque detection value Td is supplied to the torque comparison section 30. The torque limit value Tu identical in a place of sampling order with the torque detection value Td is supplied to the torque comparison section 30 from the sequence controller 13. Thus, the torque comparison section 30 compares the torque limit value Tu and the torque detection value Td that pertain to the same place of sampling order (step S54). When the torque detection value Td increases and reaches the torque limit value Tu, the sequence controller 13 and the servo circuit 11 performs torque control (torque limiting operation) so as to prevent the torque detection value Td from exceeding the torque limit value Tu (steps S55 and S56). Notably, Tdd in FIG. 9 indicates torque detection value data represented by graphing the torque detection values Td.

When the end of the monitor region is reached, and then the movable platen 3m reaches a low-pressure end position at which low-pressure mold clamping is to be ended; i.e., a high-pressure mold clamping start position, high-pressure mold clamping is performed by means of high-pressure control; and when a predetermined molding operation is completed, a mold opening operation is performed (steps S48, S49, S57, and S58).

Figure 5:
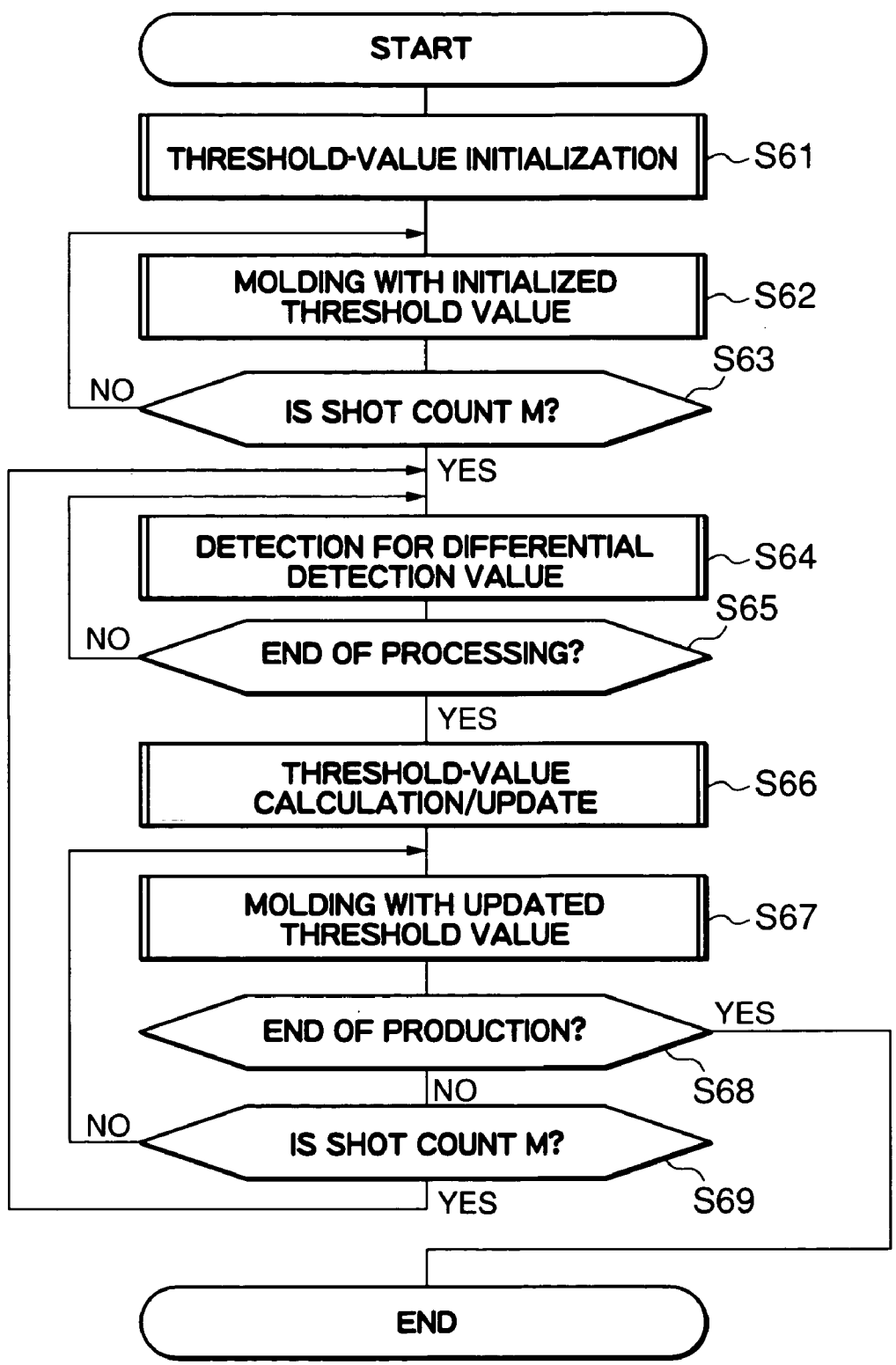
FIG. 5 is a flowchart showing a method of updating threshold data used in the mold-clamping control method.
Figure 6:
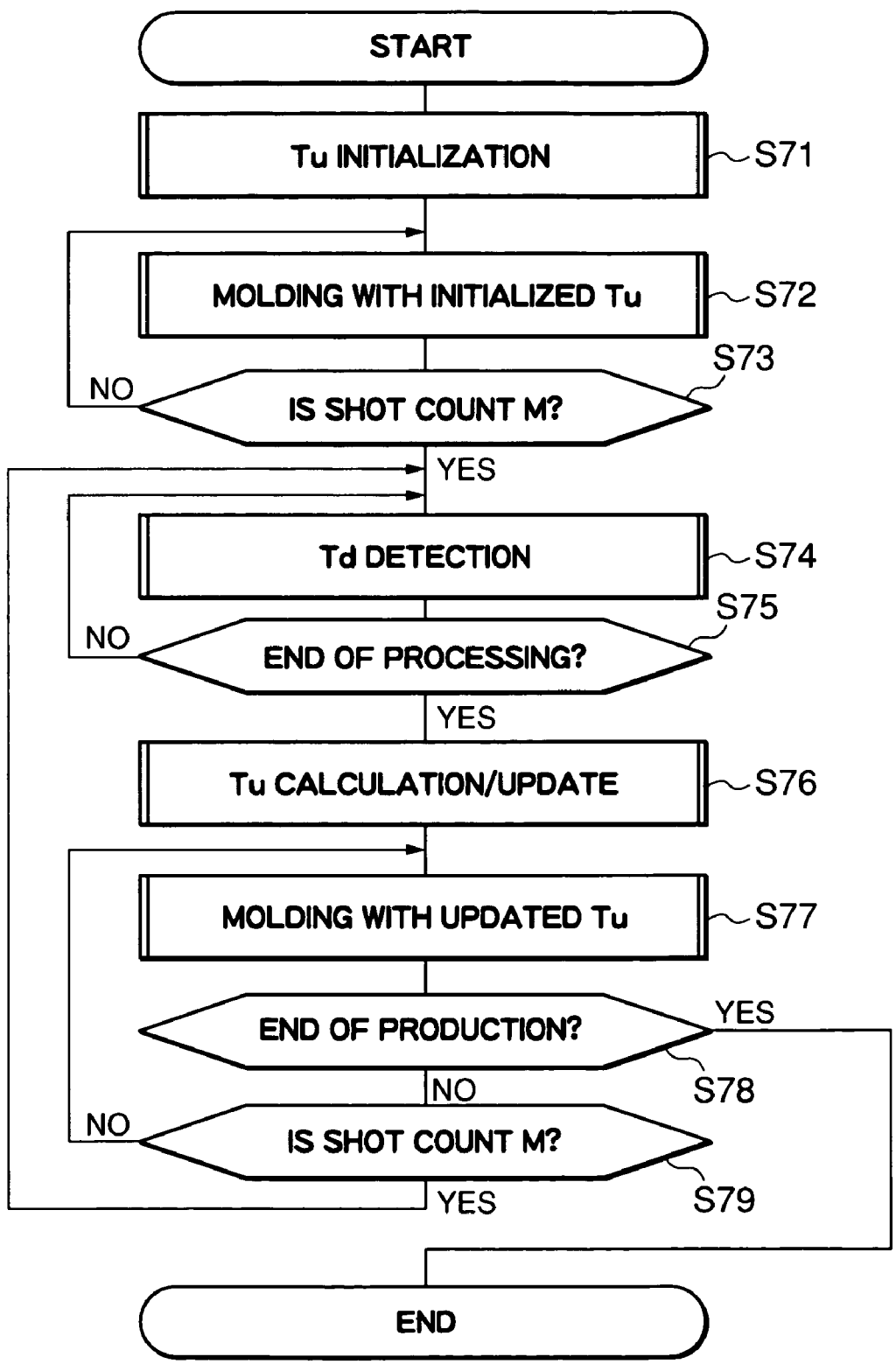
FIG. 6 is a flowchart showing a method of updating torque limit data used in the mold-clamping control method.

Next, a method of updating the threshold value Di (threshold value data Dis) and the torque limit value data Tus will be described with reference to the flowcharts shown in FIGS. 5 and 6. FIG. 5 shows a method of updating the threshold value data Dis, and FIG. 6 shows a method of updating the torque limit value data Tus.

In the case where the injection molding machine 1 is automatically operated in a 24-hour run mode, the magnitude of torque varies depending on an hour of the day because of, for example, temperature variations between day and night. Thus, even when the threshold data Dis and the torque limit value data Tus are set properly, erroneous detection may occur at a certain hour of the day during a production run. In order to cope with such a problem, in the present embodiment, each time the number of shots reaches a preset count M, the aforementioned automatic setting mode is effected; specifically, processing is performed in accordance with the flowcharts shown in FIGS. 1 and 2 so as to periodically update (automatically update) the threshold data Dis and the torque limit value data Tus. The count M can be set to, for example, "100."

In this case, unless an anomalous event (detection of a foreign object) arises, the automatic setting mode can be effected while production is maintained, thereby updating the threshold value data Dis and the torque limit value data Tus. In FIG. 5, step S61 refers to an operation of initializing the threshold value data Dis in accordance with the flowchart of FIG. 1. In FIG. 6, step S71 refers to an operation of initializing the torque limit value data Tus in accordance with the flowchart of FIG. 2.

When the threshold value Di (threshold value data Dis) and the torque limit value Tu (torque limit value data Tus) are initialized, a molding operation is performed by use of the initialized threshold value Di (threshold value data Dis) and the initialized torque limit value Tu (torque limit value data Tus) (steps S62 and S72). When the number of shots reaches the preset count M, a detecting operation for obtaining the differential detection value Dd (detection value data Ddd) is performed; and a detecting operation for obtaining the torque detection value Td (torque detection value data Tdd) is performed (steps S63, S64, S73, and S74). In this case, the differential detection value Dd and the torque detection value Td are extracted for each of N shots in accordance with the flowcharts of FIGS. 1 and 2. When the extracting operation is completed for all of N shots, new threshold value data Dis and new torque limit value data Tus are obtained for update (steps S65, S66, S75, and S76).

When the threshold value Di (threshold value data Dis) and the torque limit value Tu (torque limit value data Tus) are updated, a molding operation is similarly continued by use of the updated threshold value Di (threshold value data Dis) and the updated torque limit value Tu (torque limit value data Tus) (steps S67 and S77). Subsequently, a similar updating operation is repeated until production under a production scheme is completed. Specifically, as in the case of initialization, when the number of shots reaches the preset count M, a detecting operation for obtaining the differential detection value Dd and the torque detection value Td is performed. The differential detection value Dd and the torque detection value Td are extracted for each of N shots in accordance with the flowcharts of FIGS. 1 and 2. Subsequently, new threshold value data Dis and new torque limit value data Tus are obtained for update (steps S68, S69, S64, etc.; and steps S78, S79, S74, etc.).

As described above, the mold-clamping control method according to the present embodiment performs, in the automatic setting mode, the steps of periodically detecting a monitor item (such as load torque) in the monitor region at the preset sampling intervals Δts to thereby obtain detection values Dd in sampling order; repeating the step of periodical detection for each of a preset number (N) of shots; obtaining the threshold values Di for individual places of sampling order, on the basis of the obtained detection values Dd, by use of a predetermined arithmetic expression; and storing the obtained threshold values Di for use in control. Thus, even when a disturbance causes variations in torque, erroneous detection of a foreign object can be reliably prevented, thereby avoiding unnecessary suspension of operation and ensuring high consistency and high reliability in terms of mold-clamping control.

Also, the average value Xi and the maximum value Xw are obtained from the detection values Dd that pertain to the same place of sampling order with respect to all of the shots; and the thus-obtained average value Xi and maximum value Xw are used to obtain the threshold values Di for individual places of sampling order by use of the arithmetic expression Di=[{(Xw−Xi)×ka}+Xi]+kb. Alternatively, in place of the average value Xi, the median Xj is obtained; and the threshold values Di are obtained, on the basis of the median Xj and the maximum value Xw, by use of the arithmetic expression Di=[{(Xw−Xj)×ka}+Xj]+kb. Thus, accurate threshold values Di can be obtained reliably and consistently. Furthermore, since the maximum value Xw is a greatest value selected from the values that pertain to a plurality of places of sampling order consisting of the place concerned and a predetermined number of preceding and subsequent places of sampling order, erroneous detection; particularly, erroneous detection that could otherwise result from dispersion in the time axis direction, can be avoided. Meanwhile, after the threshold values Di are set, every time the number of shots reaches the set count M, the threshold values Di are updated. Thus, even when the magnitude of torque varies depending on an hour of the day because of, for example, temperature variations between day and night, erroneous detection can be reliably avoided. Also, by using, as the detection value Dd, a differential detection value obtained by differentiating the torque detection value Td corresponding to detected torque, or a differential detection value obtained by differentiating a velocity detection value Vd corresponding to a detected velocity, the control method of the present embodiment can be free from any influence of an incident in which the entirety of the torque detection values Td or the velocity detection values Vd is shifted because of, for example, a drift, thereby avoiding erroneous detection.

Additionally, by using the arithmetic expression Di=[{(Xw−Xi)×(σ×kr)}+Xi]+ks, Di=[{(Xw−Xj)×(σ×kr)}+Xj]+ks, Di={Xi+(σ×ki)}+kj, or Di=[{Xj+(σ×ki)}+kj, an accurate threshold value Di can be obtained reliably and consistently. Also, in the case where the standard deviation σ is large, the threshold value Di is set large in relation to the differential detection value Dd. Thus, sensitivity in terms of detection of a foreign object becomes low (monitoring becomes loose), thereby more reliably avoiding erroneous detection. By contrast, when the standard deviation σ is small, the threshold value Di is set small in relation to the differential detection value Dd. Thus, sensitivity in terms of detection of a foreign object becomes high (monitoring becomes tight), thereby enabling more reliable detection of a foreign object.

Also, the torque detection value Td is periodically obtained through periodical detection in the monitor region at the predetermined sampling intervals Δts, and this detection is performed for each of N shots. On the basis of the thus-obtained torque detection values Td, the torque limit values Tu for individual places of sampling order are obtained by use of a predetermined arithmetic expression, and the thus-obtained torque limit values Tu are set automatically. Thus, accurate torque limit values Tu are set automatically to thereby enhance consistency in operation and prevent occurrence of erroneous detection, whereby high consistency and high reliability can be ensured in terms of mold-clamping control.

Furthermore, the average value Ai and the maximum value Aw are obtained from the torque detection values Td that pertain to the same place of sampling order with respect to all of the shots; and the torque limit value Tu for each place of sampling order is obtained, on the basis of the average value Ai and the maximum value Aw, by use of the arithmetic expression Tu=[{(Aw−Ai)×kp}+Ai]+kq. Alternatively, in place of the average value Ai, the median Aj is obtained, and, on the basis of the median Aj and the maximum value Aw, the torque limit value Tu for each place of sampling order is obtained by use of Tu=[{(Aw−Aj)×kp}+Aj]+kq. Thus, an accurate torque limit value Tu can be obtained reliably and consistently. Meanwhile, since the maximum value Aw is a greatest value selected from the values that pertain to a plurality of places of sampling order consisting of the place concerned and a predetermined number of preceding and subsequent places of sampling order, erroneous detection, which could otherwise result from dispersion in the time axis direction can, be avoided. Furthermore, after the torque limit values Tu are set, every time the number of shots reaches the set count M, the torque limit values Tu are updated. Thus, even when the magnitude of load torque varies depending on an hour of the day because of, for example, temperature variations between day and night, erroneous detection can be reliably avoided.

While the present invention has been described with reference to the preferred embodiment, the present invention is not limited thereto. Regarding structural details, technique, among others, modifications, addition, and any omission may be possible as needed without departing from the scope of the invention.

For example, the above-described embodiment uses, as a monitor item, torque of the servomotor 2 used for performing a mold closing operation. However, the present invention can be applied to the case in which velocity obtained from the velocity converter 27 shown in FIG. 8 is used as a monitor item. In this case, since the velocity detection value Vd is obtained from the velocity converter 27, the velocity detection value Vd is differentiated by means of the velocity differentiator 33 to thereby yield an acceleration value, and the thus-obtained acceleration value is used as the differential detection value Dd. Also, the acceleration comparison section 34 can be caused to perform processing similar to the aforementioned processing that is performed by the torque differentiation-comparison section 32. Also, no limitation is imposed on arithmetic expressions. Those other than the exemplified arithmetic expressions may be used as needed. Furthermore, the drive mechanism 5 of the embodiment includes the toggle link mechanism 9. However, the present invention can be applied to the case in which a direct-pressure-application type drive mechanism which does not use the toggle link mechanism is employed.

What is claimed is:

1. A mold-clamping control method for an injection molding machine, comprising:
   detecting a value of a monitor item in a monitor region predetermined in relation to a mold closing operation during the course of a mold clamping step;
   performing emergency processing when the detected value exceeds a threshold value; and
   performing an automatic setting operation including the steps of periodically detecting the value of the monitor item in the monitor region at predetermined sampling intervals to thereby obtain detection values in sampling order; repeating the step of periodical detection for each of a predetermined number of shots; obtaining a threshold value for each place of sampling order, on the basis of the detection values, by use of a predetermined arithmetic expression; and storing the obtained threshold values for use in control.

wherein a minimum value Xs and a maximum value Xw are obtained from the detection values that pertain to the same place of sampling order with respect to all of the shots; a median Xj is obtained, on the basis of the minimum value Xs and the maximum value Xw, by use of $Xj=(Xw-Xs)/2$; and a threshold value Di for each place of sampling order is obtained, on the basis of the median Xj and the maximum value Xw, by use of $$Di=[\{(Xw-Xj)\times ka\}+Xj]+kb$$

where ka and kb are constants.

2. A mold-clamping control method for an injection molding machine according to claim 1, wherein the maximum value Xw is a greatest value among the detection values that pertain to a plurality of places of sampling order consisting of the place concerned and a predetermined number of preceding and subsequent places of sampling order.

3. A mold-clamping control method for an injection molding machine according to claim 1, wherein, after the threshold values are set, every time the number of shots reaches a predetermined value, the automatic setting operation is performed in order to update the threshold values.

4. A mold-clamping control method for an injection molding machine according to claim 1, wherein the monitor item is torque of a servomotor for performing the mold closing operation.

5. A mold-clamping control method for an injection molding machine according to claim 4, wherein the detection value is a differential detection value obtained by differentiating a torque detection value corresponding to the torque.

6. A mold-clamping control method for an injection molding machine according to claim 1, wherein the monitor item is velocity of a servomotor for performing the mold closing operation.

7. A mold-clamping control method for an injection molding machine according to claim 6, wherein the detection value is a differential detection value obtained by differentiating a velocity detection value corresponding to the velocity.

8. A mold-clamping control method for an injection molding machine, comprising:

detecting a value of a monitor item in a monitor region predetermined in relation to a mold closing operation during the course of a mold clamping step;

performing emergency processing when the detected value exceeds a threshold value; and performing an automatic setting operation including the steps of periodically detecting the value of the monitor item in the monitor region at predetermined sampling intervals to thereby obtain detection values in sampling order; repeating the step of periodical detection for each of a predetermined number of shots; obtaining at least an average value and an adjustment value corresponding to a standard deviation, the average value and the standard deviation being obtained from the detection values that pertain to the same place of sampling order with respect to all of the shots; obtaining a threshold value for each place of sampling order by use of a predetermined arithmetic expression that includes a term of the average value and a term of the adjustment value; and storing the obtained threshold values for use in control, wherein a threshold value Di for each place of sampling order is obtained by use of $$Di=[\{(Xw-Xi)\times(\sigma\times kr)\}+Xi]+ks$$

where Xi is the average value; $\sigma$ is the standard deviation; $(\sigma\times kr)$ is the adjustment value; Xw is a maximum value obtained from the detection values that pertain to the same place of sampling order with respect to all of the shots; and kr and ks are constants.

9. A mold-clamping control method for an injection molding machine according to claim 8, wherein the maximum value Xw is a greatest value among the detection values that pertain to a plurality of places of sampling order consisting of the place concerned and a predetermined number of preceding and subsequent places of sampling order.

10. A mold-clamping control method for an injection molding machine according to claim 8, wherein, after the threshold values are set, every time the number of shots reaches a predetermined value, the automatic setting operation is performed in order to update the threshold values.

11. A mold-clamping control method for an injection molding machine according to claim 8, wherein the monitor item is torque of a servomotor for performing the mold closing operation.

12. A mold-clamping control method for an injection molding machine according to claim 11, wherein the detection value is a differential detection value obtained by differentiating a torque detection value corresponding to the torque.

13. A mold-clamping control method for an injection molding machine according to claim 8, wherein the monitor item is velocity of a servomotor for performing the mold closing operation.

14. A mold-clamping control method for an injection molding machine according to claim 13, wherein the detection value is a differential detection value obtained by differentiating a velocity detection value corresponding to the velocity.

15. A mold-clamping control method for an injection molding machine, comprising:

detecting load torque in a monitor region predetermined in relation to a mold closing operation during the course of a mold clamping step;

performing torque control when a torque detection value obtained through detecting the load torque reaches a set torque limit value, so as to prevent the load torque from exceeding the torque limit value; and performing an automatic setting operation including the steps of periodically detecting the load torque in the monitor region at predetermined sampling intervals to thereby obtain torque detection values in sampling order; repeating the step of periodical detection for each of a predetermined number of shots; obtaining a torque limit value for each place of sampling order, on the basis of the obtained torque detection values, by use of a predetermined arithmetic expression; and storing the obtained torque limit values for use in control, wherein a minimum value As and a maximum value Aw are obtained from the torque detection values that pertain to the same place of sampling order with respect to all of the shots; a median Aj is obtained, on the basis of the minimum value As and the maximum value Aw, by use of $Aj=(Aw-As)/2$; and a torque limit value Tu for each place of sampling order is obtained, on the basis of the median Aj and the maximum value Aw, by use of $$Tu=[\{(Aw-Aj) \times kp\}+Aj]kq$$

where kp and ka are constants.

16. A mold-clamping control method for an injection molding machine according to claim 15, wherein the maximum value Aw is a greatest value among the torque detection values that pertain to a plurality of places of sampling order consisting of the place concerned and a predetermined number of preceding and subsequent places of sampling order.

17. A mold-clamping control method for an injection molding machine according to claim 15, wherein, after the torque limit values are set, every time the number of shots reaches a predetermined value, the automatic setting operation is performed in order to update the torque limit values.

18. A mold-clamping control method for an injection molding machine, comprising:
  detecting a value of a monitor item in a monitor region predetermined in relation to a mold closing operation during the course of a mold clamping step;
  performing emergency processing when the detected value exceeds a threshold value; and
  performing an automatic setting operation including the steps of periodically detecting the value of the monitor item in the monitor region at predetermined sampling intervals to thereby obtain detection values in sampling order; repeating the step of periodical detection for each of a predetermined number of shots; obtaining a threshold value for each place of sampling order, on the basis of the detection values, by use of a predetermined arithmetic expression; and storing the obtained threshold values for use in control,
  wherein an average value Xi and a maximum value Xw are obtained from the detection values that pertain to the same place of sampling order with respect to all of the shots; and a threshold value Di for each place of sampling order is obtained, on the basis of the average value Xi and the maximum value Xw, by use of $$Di=[\{(Xw-Xi) \times ka\}+Xi]+kb$$

where ka and kb are constants.

19. A mold-clamping control method for an injection molding machine according to claim 18, wherein the maximum value Xw is a greatest value among the detection values that pertain to a plurality of places of sampling order consisting of the place concerned and a predetermined number of preceding and subsequent places of sampling order.

20. A mold-clamping control method for an injection molding machine, comprising:
  detecting load torque in a monitor region predetermined in relation to a mold closing operation during the course of a mold clamping step;
  performing torque control when a torque detection value obtained through detecting the load torque reaches a set torque limit value, so as to prevent the load torque from exceeding the torque limit value; and
  performing an automatic setting operation including the steps of periodically detecting the load torque in the monitor region at predetermined sampling intervals to thereby obtain torque detection values in sampling order; repeating the step of periodical detection for each of a predetermined number of shots; obtaining a torque limit value for each place of sampling order, on the basis of the obtained torque detection values, by use of a predetermined arithmetic expression; and storing the obtained torque limit values for use in control,
  wherein an average value Ai and a maximum value Aw are obtained from the torque detection values that pertain to the same place of sampling order with respect to all of the shots; and a torque limit value Tu for each place of sampling order is obtained, on the basis of the average value Ai and the maximum value Aw, by use of $$Tu=[\{(Aw-Ai) \times kp\}+Ai]kq$$

where kp and kq are constants.

21. A mold-clamping control method for an injection molding machine according to claim 20, wherein the maximum value Aw is a greatest value among the torque detection values that pertain to a plurality of places of sampling order consisting of the place concerned and a predetermined number of preceding and subsequent places of sampling order.

* * * * *